(12) United States Patent
Khaliq et al.

(10) Patent No.: US 8,386,453 B2
(45) Date of Patent: Feb. 26, 2013

(54) PROVIDING SEARCH INFORMATION RELATING TO A DOCUMENT

(75) Inventors: Siraj Khaliq, San Francisco, CA (US); William C. Brougher, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 2023 days.

(21) Appl. No.: 10/953,112

(22) Filed: Sep. 30, 2004

(65) Prior Publication Data

US 2006/0074868 A1 Apr. 6, 2006

(51) Int. Cl.
*G06F 7/00* (2006.01)

(52) U.S. Cl. ....................................... 707/706

(58) Field of Classification Search .................. None
See application file for complete search history.

(56) References Cited

U.S. PATENT DOCUMENTS

| | | | | |
|---|---|---|---|---|
| 5,317,507 A | * | 5/1994 | Gallant | 715/532 |
| 5,708,825 A | * | 1/1998 | Sotomayor | 715/501.1 |
| 5,713,016 A | * | 1/1998 | Hill | 707/5 |
| 5,787,424 A | * | 7/1998 | Hill et al. | 707/6 |
| 5,799,325 A | * | 8/1998 | Rivette et al. | 715/500 |
| 5,845,301 A | * | 12/1998 | Rivette et al. | 715/512 |
| 5,893,109 A | * | 4/1999 | DeRose et al. | 707/104.1 |
| 5,987,457 A | * | 11/1999 | Ballard | 707/5 |
| 6,032,145 A | * | 2/2000 | Beall et al. | 707/5 |
| 6,112,201 A | * | 8/2000 | Wical | 707/5 |
| 6,122,647 A | | 9/2000 | Horowitz et al. | 707/513 |
| 6,169,992 B1 | * | 1/2001 | Beall et al. | 707/103 R |
| 6,240,410 B1 | * | 5/2001 | Wical | 707/4 |
| 6,285,999 B1 | | 9/2001 | Page | 707/5 |
| 6,321,224 B1 | * | 11/2001 | Beall et al. | 707/5 |
| 6,732,090 B2 | * | 5/2004 | Shanahan et al. | 707/3 |
| 6,785,670 B1 | * | 8/2004 | Chiang et al. | 707/706 |
| 6,847,977 B2 | * | 1/2005 | Abajian | 707/102 |
| 6,968,332 B1 | * | 11/2005 | Milic-Frayling et al. | 707/3 |
| 7,076,497 B2 | * | 7/2006 | Donteverde | 1/1 |
| 7,149,743 B2 | * | 12/2006 | Colwill, Jr. | 707/102 |
| 7,158,971 B1 | * | 1/2007 | Bascom | 707/10 |
| 7,200,804 B1 | * | 4/2007 | Khavari et al. | 715/513 |
| 7,287,214 B1 | * | 10/2007 | Jenkins et al. | 715/205 |
| 2004/0138988 A1 | * | 7/2004 | Munro et al. | 705/37 |
| 2005/0004835 A1 | * | 1/2005 | Roslansky et al. | 705/14 |
| 2005/0222989 A1 | * | 10/2005 | Haveliwala et al. | 707/3 |
| 2006/0036659 A1 | * | 2/2006 | Capriati et al. | 707/204 |
| 2006/0143016 A1 | * | 6/2006 | Jones et al. | 704/270.1 |
| 2006/0143565 A1 | * | 6/2006 | Jones | 715/717 |
| 2006/0143674 A1 | * | 6/2006 | Jones et al. | 725/113 |
| 2006/0173825 A1 | * | 8/2006 | Hess et al. | 707/3 |

(Continued)

FOREIGN PATENT DOCUMENTS

| | | |
|---|---|---|
| JP | 09-305623 A | 11/1997 |
| JP | 2003-256471 A | 9/2003 |

OTHER PUBLICATIONS

Barnes & Noble.com—Book Search; www.bn.com; Aug. 12 and 17, 2004 (print date); pp. 1-7.

(Continued)

*Primary Examiner* — Hung Q Pham
*Assistant Examiner* — Hubert Cheung
(74) *Attorney, Agent, or Firm* — Harrity & Harrity, LLP

(57) ABSTRACT

A system identifies a document, performs a search to identify web documents relating to an attribute associated with the document, and provides information associated with the web documents and the document.

25 Claims, 14 Drawing Sheets

U.S. PATENT DOCUMENTS

2007/0016578 A1* 1/2007 Melman .................... 707/5
2007/0180380 A1* 8/2007 Khavari et al. ............. 715/704
2007/0214126 A1* 9/2007 Kikinis ....................... 707/3

OTHER PUBLICATIONS

Amazon.com—Book Search; http://www.amazon.com ; Aug. 12, 2004 (print date); pp. 1-16.

Amazon.com; "Books Search Inside the Search"; Jul. 18, 2004; 3 pages.

Amazon.com; "Good to Great: Why Some Companies Make the Leap . . . and Others Don't"; Jul. 12, 2004; 8 pages.

International Search Report for corresponding PCT application with a mailing date of Feb. 21, 2005; 4 pages.

Etsuko Shirahase, "Mac Fan Internet", Japan Kabushiki-Kaisha Mainishi Communications, Jan. 1, 2001, vol. 6, No. 1, 5 pages. (Includes partial English translation).

\* cited by examiner

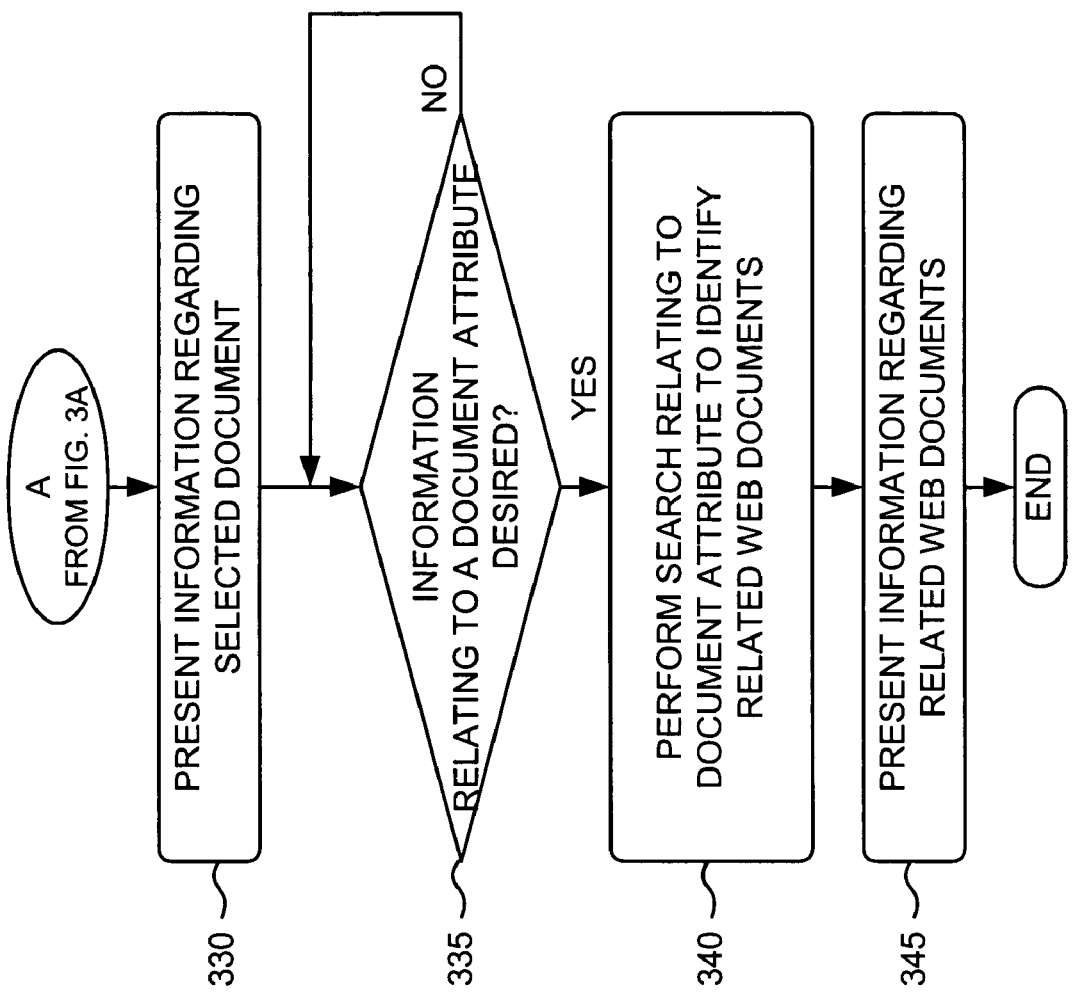

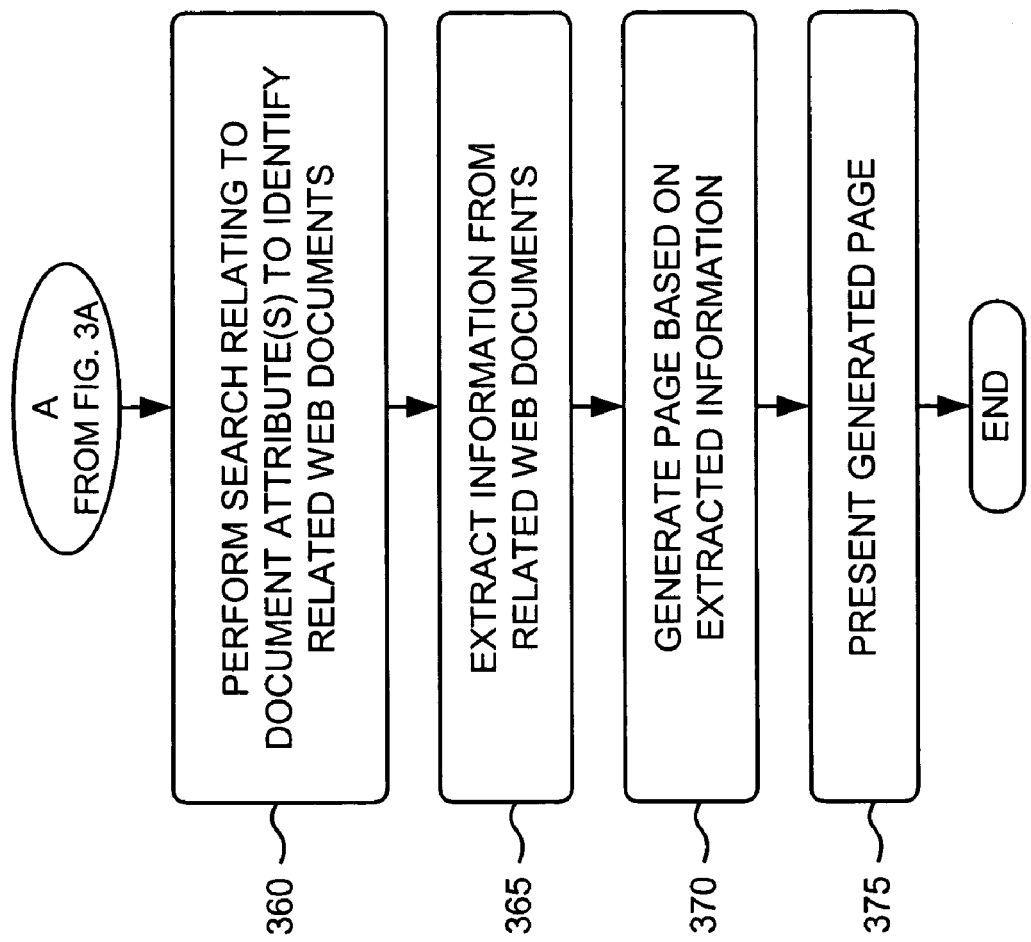

REVIEW OF THE DOCUMENT — 542

712 — AMAZON.COM: BOOKS: THE 9/11 COMMISSION REPORT: FINAL...
714 — ... But no matter what it says, The 9/11 Report will be a book that goes down ...
716 — WWW.AMAZON.COM/EXEC/ABCDEFG - 75K - SEP 22, 2004

} 710

THE NEW YORK TIMES > BOOKS > BOOK REVIEW > THE 9/11 REPORT ...
... The 9/11 Report: A Dissent ...
WWW.NYTIMES.COM/2004/08/29/BOOKS/REVIEW/ABCDEFG.HTML

MORE RESULTS

BIOGRAPHY OF THE AUTHOR — 544

REVIEW OF THE DOCUMENT ——— 542 ⎫
812 ⎯ AMAZON.COM: REVIEW          ⎪
814 ⎯ CUSTOMER RATING: ☆☆☆☆☆     ⎪
                                   ⎪
816 ⎯ AMAZON EDITOR: The report is superb in its detail and thoroughness. The  ⎬ 810
       bipartisan panel performed months of intensive investigations and inquiries and ⎪
       created one of the most comprehensive reports in history. The 9/11 Commission ⎪
       Report finds its place in the history of great works. ...  ⎪
818 ⎯ WWW.AMAZON.COM/EXEC/ABCDEF - 71K - SEP 23, 2004  ⎭

BARNES AND NOBLE.COM REVIEW

CUSTOMER RATING: ☆☆☆☆☆

FROM THE PUBLISHER: The total disregard for life that occurred on September
11th finds no comparisons in our nation's history. This event has changed our
nation forever. The 9/11 Commission Report provides a spectacular description
of the events of September 11th. It is both thorough and thought-provoking ...
WWW.BARNESNOBLE.COM/2004/08/29/BOOKS/REVIEW/ABCDEF.HTML

MORE RESULTS

BIOGRAPHY OF THE AUTHOR ——— 544

•••

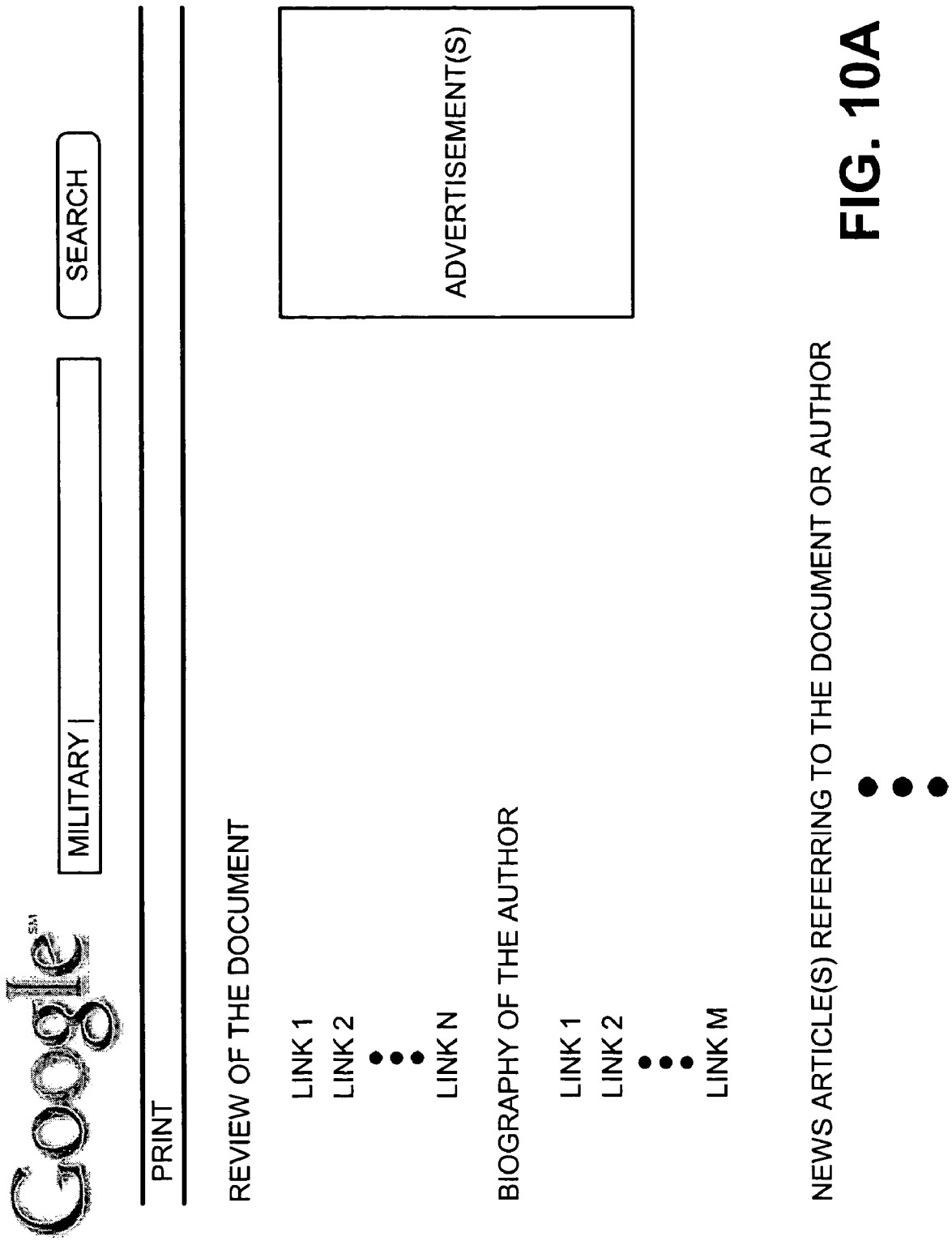

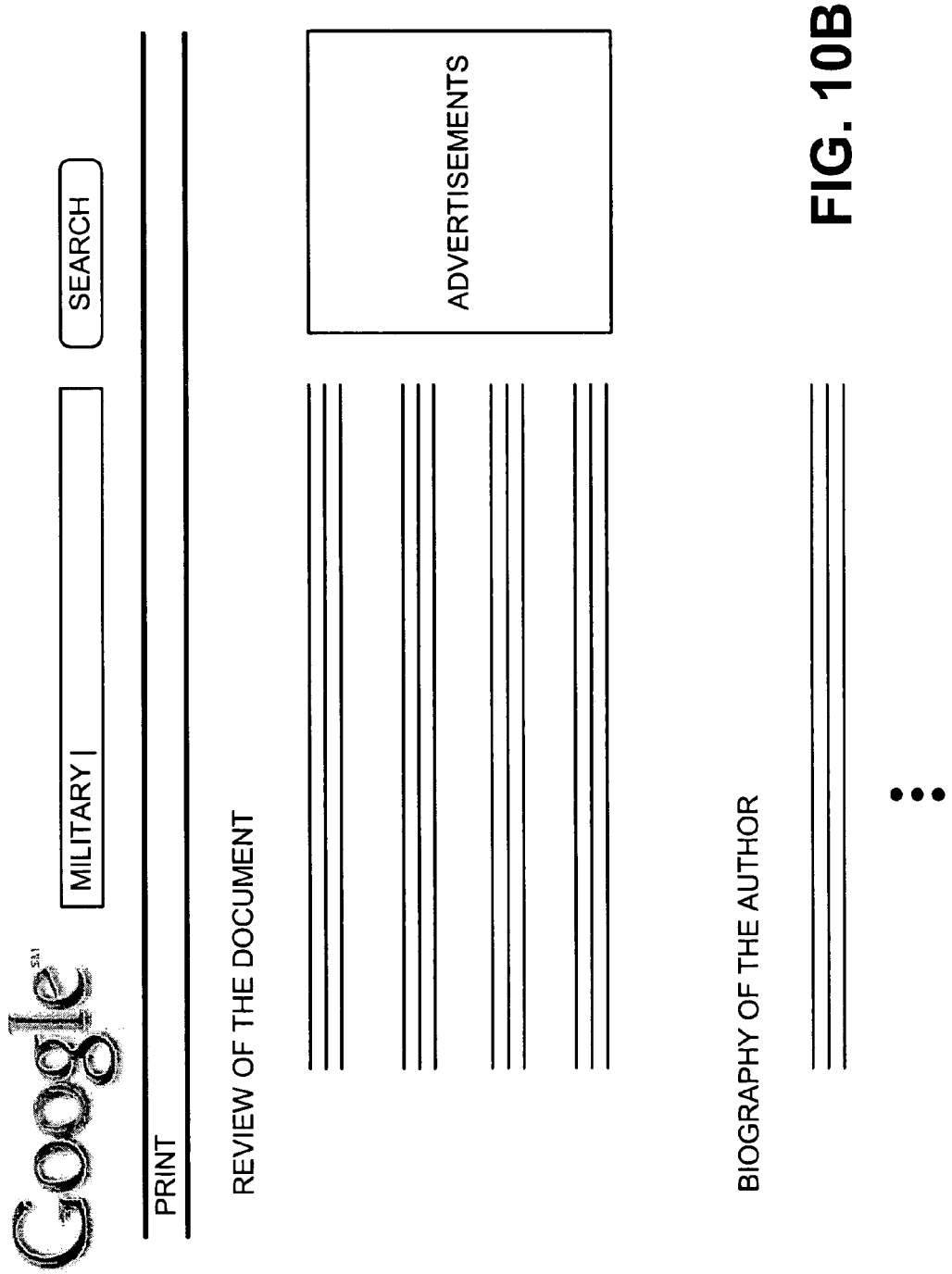

PROVIDING SEARCH INFORMATION RELATING TO A DOCUMENT

BACKGROUND

1. Field of the Invention

Systems and methods consistent with the principles of the invention relate generally to information retrieval and, more particularly, to the providing of information that is relevant to a particular document.

2. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

SUMMARY

According to one aspect, a method may include receiving a search query, performing a first search to identify a document based on the search query, performing a second search based on an attribute associated with the document, and presenting a result of the second search.

According to another aspect, a system may include a memory to store instructions and a processor to execute the instructions. The system may identify a document, perform a search to identify a web document with information relating to an attribute associated with the document, and present information associated with the web document.

According to yet another aspect, a graphical user interface embodied in a computer-readable medium may include a set of links to portions of a document, a description of the contents of the document, and bibliographic information associated with the document. The graphical user interface may also include a link to cause a search to be performed for a web document with information relating to an attribute associated with the document.

According to a further aspect, a method may include receiving identification of a document from a user, automatically performing a plurality of searches to identify web documents relating to attributes associated with the document, and providing information associated with the web documents to the user.

According to yet another aspect, a computer-readable medium may contain computer-executable instructions, including instructions for identifying a document, instructions for performing a search to identify web documents with information relating to an attribute associated with the document, instructions for extracting information from the web documents, and instructions for presenting the extracted information along with information associated with the document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A-3D are flowcharts of exemplary processing for presenting information regarding web documents related to a document according to some implementations consistent with the principles of the invention;

FIG. 7 is an exemplary diagram of a portion of a reference page according to another implementation consistent with the principles of the invention;

FIG. 8 is an exemplary diagram of a portion of a reference page according to a further implementation consistent with the principles of the invention;

FIGS. 10A and 10B are exemplary diagrams of graphical user interfaces in which related information may be presented according to two different implementations consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

OVERVIEW

More and more types of documents are becoming searchable via search engines. For example, some documents, such as books, magazines, and/or catalogs, may be scanned and their text recognized via OCR. It is beneficial to understand more about these documents and make this additional information available to users.

Systems and methods consistent with the principles of the invention may automatically search for additional information relating to one or more attributes associated with a document (also referred to as "document attributes") and provide this additional information in association with the document.

Exemplary Network Configuration

Figure 1:
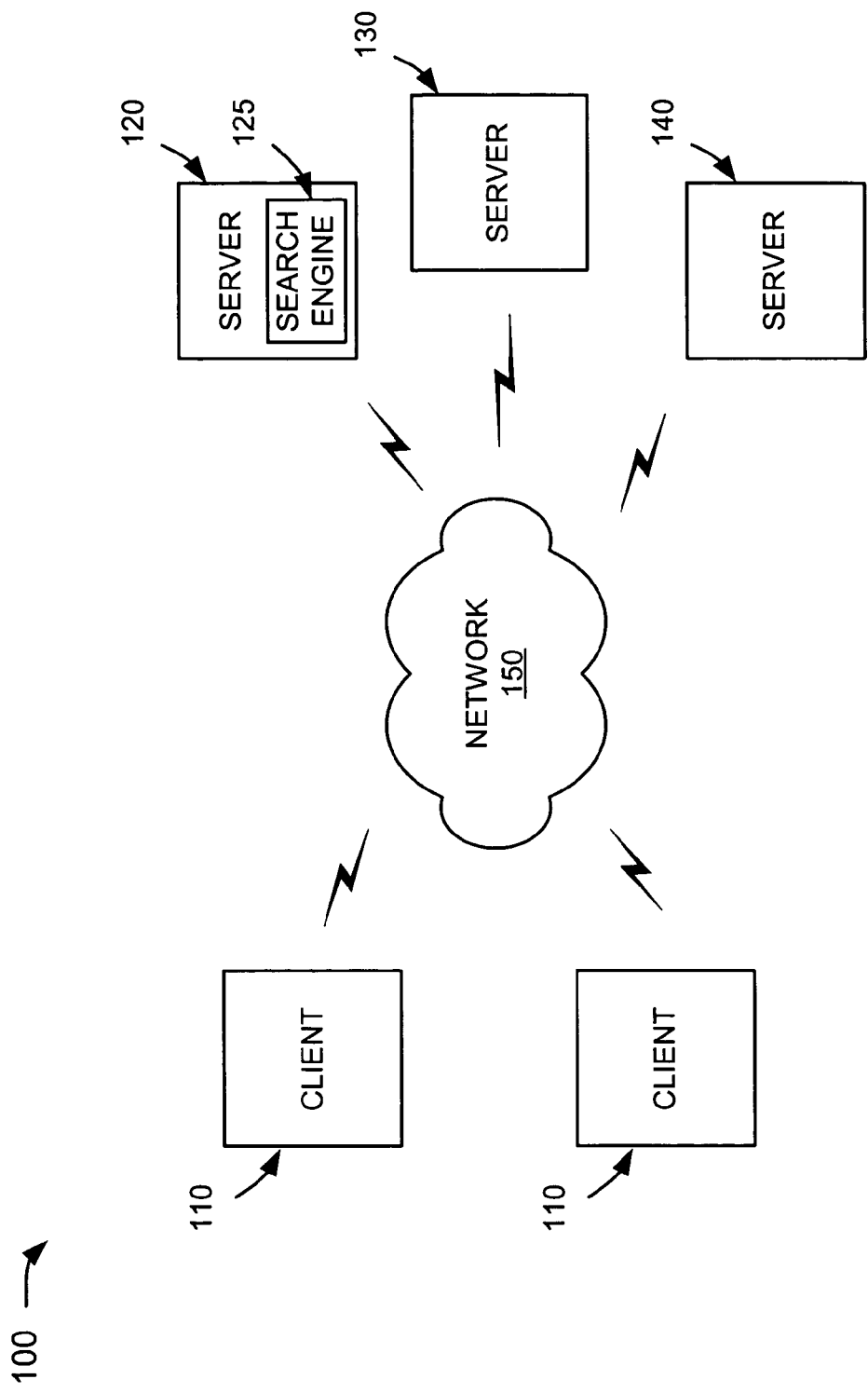
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120, 130, and 140 via a network 150. Two clients 110 and three servers 120, 130, and 140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120, 130, and 140 may include server entities that gather, process, search, and/or maintain documents in a manner consistent with the principles of the invention.

In an implementation consistent with the principles of the invention, server 120 may include a search engine 125 usable by clients 110. Server 120 may crawl a corpus of documents (e.g., web documents), index the documents, and store information associated with the documents in a repository of documents. Alternatively or additionally, server 120 may analyze a database (or set of databases) of documents (e.g., books, magazines, newspapers, articles, catalogs, etc.) and store information associated with the documents in the same or a different repository. Servers 130 and 140 may store or maintain documents that may be crawled or analyzed by server 120.

While servers 120, 130, and 140 are shown as separate entities, it may be possible for one or more of servers 120, 130, and 140 to perform one or more of the functions of another one or more of servers 120, 130, and 140. For example, it may be possible that two or more of servers 120, 130, and 140 are implemented as a single server. It may also be possible for a single one of servers 120, 130, and 140 to be implemented as two or more separate (and possibly distributed) devices.

Network 150 may include a local area network (LAN), a wide area network (WAN), a telephone network, such as the Public Switched Telephone Network (PSTN), an intranet, the Internet, a memory device, or a combination of networks. Clients 110 and servers 120, 130, and 140 may connect to network 150 via wired, wireless, and/or optical connections.

A "document," as the term is used herein, is to be broadly interpreted to include any traditional printed work of authorship, such as books, magazines, catalogs, newspapers, articles, etc. A "web document," as the term is used herein, is to be broadly interpreted to include any machine-readable and machine-storable work product available via a network, such as network 150. A web document may include, for example, a web site, a file, a combination of files, one or more files with embedded links to other files, a news group posting, a blog, a web advertisement, etc. In the context of the Internet, a common web document is a web page. Web pages often include textual information and may include embedded information (such as meta information, images, hyperlinks, etc.) and/or embedded instructions (such as JavaScript™, etc.). A "link," as the term is used herein, is to be broadly interpreted to include any reference to or from a web document.

Exemplary Client/Server Architecture

Figure 2:
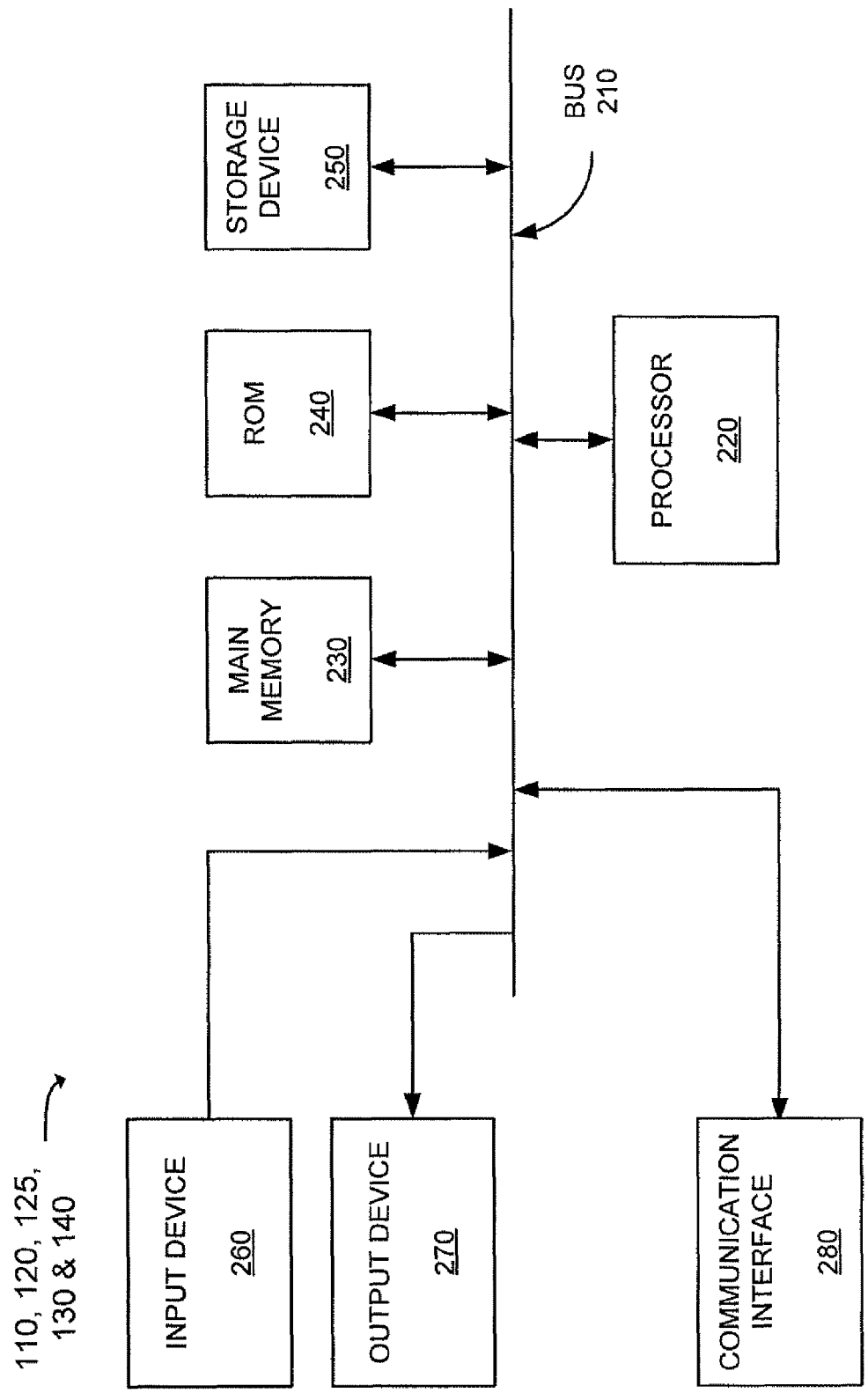
FIG. 2 is an exemplary diagram of a client or server of FIG. 1 according to an implementation consistent with the principles of the invention.

FIG. 2 is an exemplary diagram of a client or server entity (hereinafter called "client/server entity"), which may correspond to one or more of clients 110 and servers 120, 130, and 140, according to an implementation consistent with the principles of the invention. The client/server entity may include a bus 210, a processor 220, a main memory 230, a read-only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that interprets and executes instructions. Main memory 230 may include a random-access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A-3D are flowcharts of exemplary processing for presenting information regarding web documents related to a document according to some implementations consistent with the principles of the invention. Processing may begin with a user providing a search term (or a group of search terms) as a search query for searching a document repository. In one implementation, the document repository includes documents available from the Internet and/or a database (or set of databases) and the vehicle for searching this repository is a search engine, such as search engine 125 (FIG. 1). The user may provide the search query via web browser software on a client, such as client 110 (FIG. 1).

Figure 3A:
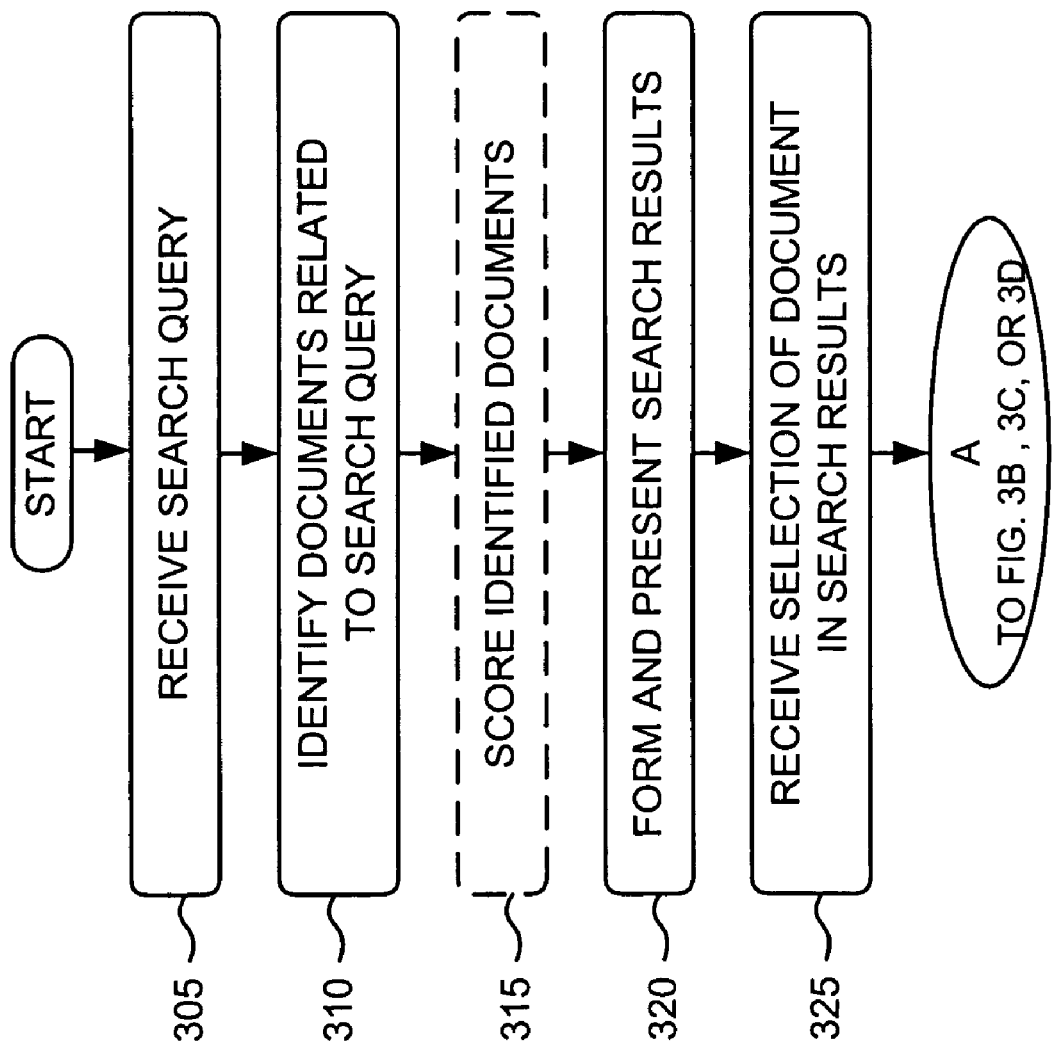

The search query may be received by the search engine and used to identify documents (e.g., books, magazines, newspapers, articles, catalogs, etc.) related to the search query (acts 305 and 310) (FIG. 3A). A number of techniques exist for identifying documents related to a search query. One such technique might include identifying documents that contain the search term or perhaps a synonym of the search term. When the search query includes more than one search term, then a technique might include identifying documents that contain the search terms as a phrase, that contain the search terms but not necessarily together, or that contain less than all of the search terms. Yet other techniques are known to those skilled in the art.

Optionally, the documents may be scored in some manner (act 315). For example, the score for a document may be based on an information retrieval (IR) score. Several techniques exist for generating an IR score. For example, an IR score for a document may be generated based on the number of occurrences of the search terms in the document text, where the search terms occur within the document (e.g., in a title, body, footer, header, etc.), or characteristics of occurrences of the search terms (e.g., font, size, color, etc.). Yet other techniques are known to those skilled in the art.

Search results may be formed based on the documents and their optional scores and presented to the user (act 320). In one implementation, the search results may include information associated with the documents, such as links to the documents, that may optionally be sorted based on the document scores. The search results may be provided as a HTML document, similar to search results provided by conventional search engines. Alternatively, the search results may be provided according to another format agreed upon by the search engine and the client (e.g., Extensible Markup Language (XML)).

Figure 4:
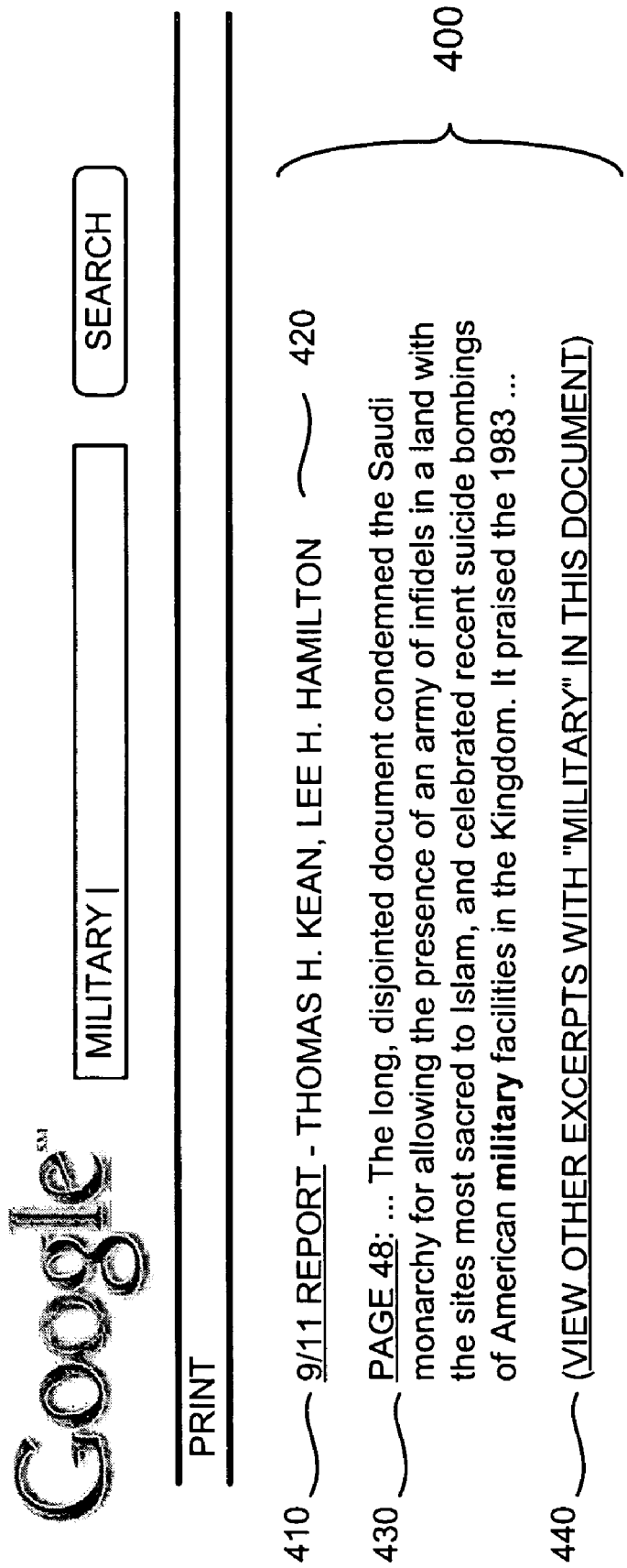
FIG. 4 is an exemplary diagram of a graphical user interface in which information associated with a document may be presented in the form of a search result according to one implementation consistent with the principles of the invention.

FIG. 4 is an exemplary diagram of a graphical user interface in which information associated with a document may be presented in the form of a search result 400 according to one implementation consistent with the principles of the invention. As shown in FIG. 4, search result 400 may include a document title 410, author information 420, an excerpt 430 from the document, and optionally a link 440 to other relevant excerpts in the document. Assume for this example, and the examples to follow, that a user has performed a search for documents relating to the search term "military" and one resulting document includes the "9/11 Report."

Document title 410 may include the title associated with the document. Selection of document title 410 may cause detailed information associated with the document, possibly in the form of a reference page (described below) to be presented. Author information 420 may include the name(s) of the author(s) of the document. Excerpt 430 may include a portion of the document that includes a search term of the search query. Occurrences of the search term may be visually distinguished (e.g., highlighted) within excerpt 430. Link 440 may permit one or more other excerpts from the document that contain a search term to be presented to the user.

Returning to FIG. 3A, one of the documents in the search results may be selected by the user (act 325). Various well-known techniques may be used for selecting. For example, selection may be made by clicking, mouseover, mouseover, keyboard strike, etc. In one implementation, selection of a document may include selection of a link associated with the document, such as selection of document title 410 as shown in FIG. 4.

Figure 5:
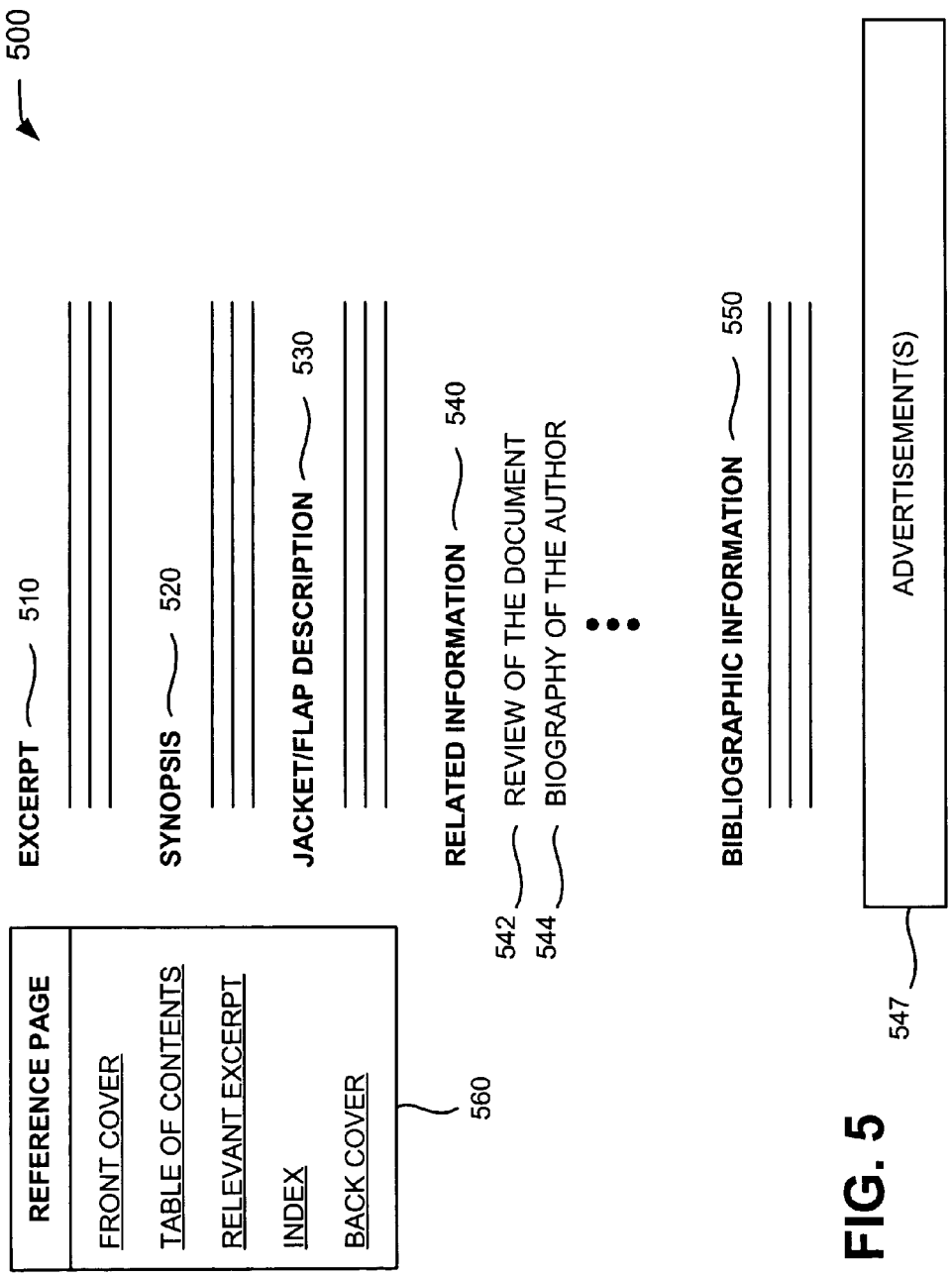
FIG. 5 is an exemplary diagram of a presentation of a reference page associated with a document according to one implementation consistent with the principles of the invention.

In one implementation consistent with the principles of the invention, detailed information regarding the document, possibly in the form of a reference page, may be presented to the user in response to the user selecting the document (act 330) (FIG. 3B). FIG. 5 is an exemplary diagram of a reference page 500 associated with a document according to one implementation consistent with the principles of the invention. As shown in FIG. 5, reference page 500 may include an excerpt 510 from the document, a synopsis 520 regarding the document, a jacket or flap description 530 associated with the document, related information 540, bibliographic information 550, and a set of links 560 to different portions of the document. In other implementations, reference page 500 may include more, fewer, or different types of information.

Excerpt 510 may include a portion of text from the document that may include a search term of the search query. The portion of text may correspond to an image of the document text or the text version. Occurrences of the search term may be visually distinguished (e.g., highlighted) in the portion of text. Synopsis 520 may include a brief description of the contents of the document. Jacket or flap description 530 may include text from a jacket, cover, or flap associated with the document.

Bibliographic information 550 may include information, such as the ISBN, ISSN, the name of the publisher, the category code that identifies a category of the topical content of the document, and/or the publication date. In other implementations, bibliographic information 550 may include more, fewer, or different pieces of information. Links 560 may include links to various portions of the document. For example, the links may reference the front cover, the table of contents, relevant excerpt(s), the index, and/or the back cover of the document. Selection of one of the links may cause an image of the corresponding document portion to be presented.

Related information 540 may include various types of information related to the document that a user might find useful. This information may be obtained by performing a search relating to a document attribute (e.g., title, author, category, publisher, publication date, etc.) to identify relevant web documents.

Examples of information that might be obtained by the search might include information associated with a review of the document, information associated with a topic of the document, information associated with a subject or category of the document, information associated with a book in the same series as the document, information associated with a magazine issue in the same magazine as the document, information associated with an article in the same journal, from the same conference, or in the same magazine as the document, information associated with a news article, blog, or another type of posting that refers to the document or an author of the document, information associated with a product relating to the document or a topic of the document, information associated with a publisher of the document, information associated with a publication date associated with the document, information associated with a biography of the author, information associated with a web document relating to the author, such as the author's web page, information associated with an image of the author, and/or information associated with other documents by the same author.

In one implementation, related information 540 may include a list of links associated with one or more document attributes. As shown in FIG. 5, two exemplary links 542 and 544 are shown. In practice, there may be additional links. Selection of one of the links may cause a search to be performed relating to a particular document attribute. For example, selection of the link associated with a biography of the author 544 may cause a search to be performed to identify a web document that includes information relating to a biography of the author of the document. Techniques for forming search queries relating to various topics are well known in the art.

Related information 540 may optionally also include a set of advertisements related to one or more of the document attributes 547. For example, an advertisement may offer for sale the document, a portion of the document, other documents associated with the author, or other documents relating to a same topic as the document. The set of advertisements 547 may also, or alternatively, be associated with or derived from other information, such as a term of a search query, another (e.g., related) document, or user behavior (e.g., searching or viewing history).

Returning to FIG. 3B, it may be determined whether information relating to a document attribute is desired (act 335). For example, it may be determined whether the user selected one of the links or an advertisement associated with related information 540. If information relating to a document attribute is desired, then a search may be performed relating to the document attribute to identify related web documents (act 340). For example, if the user desired information regarding a review of the document, a search may be performed using, for example, a word or words associated with the document's title or the author's name and a word like "review" or "reviews" as a search query. Techniques similar to the ones described above may be used to identify web documents relevant to the search query.

The web documents may optionally be scored based on an IR score and/or a link-based score. Several techniques exist for generating IR and link-based scores. An exemplary technique for generating an IR score might be based on the number of occurrences of the search term in the document. An exemplary technique for generating a link-based score is described in U.S. Pat. No. 6,285,999. Yet other techniques are known to those skilled in the art.

In another implementation, searches may be performed for all of the links associated with related information 540 as background tasks. In other words, relevant web documents may be identified for the different types of information associated with related information 540 and these relevant web documents may be cached for later presentation to the user when the user indicates a desire for such information.

Search results may be formed based on the web documents and their optional scores and presented to the user (act 345). In one implementation, the search results may include information associated with the web documents, such as links to the web documents, that may optionally be sorted based on the web document scores. The search results may be provided as a HTML document, similar to search results provided by conventional search engines. Alternatively, the search results may be provided according to a format agreed upon by the search engine and the client (e.g., XML).

Figure 6:
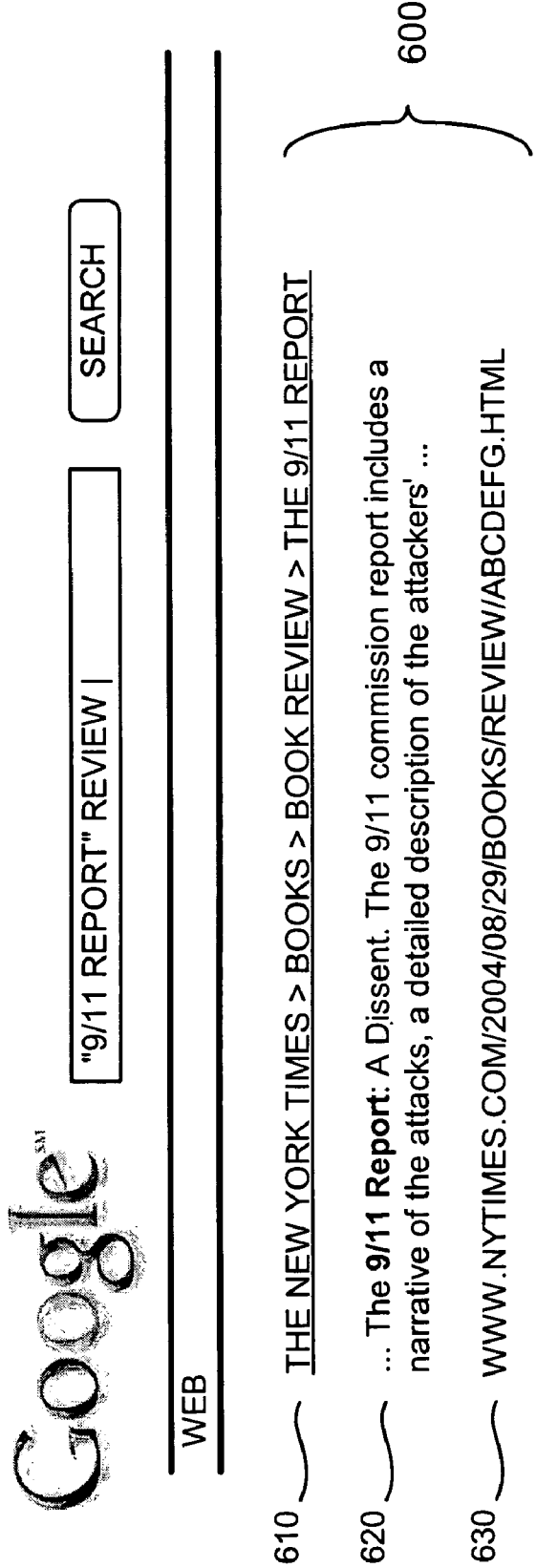
FIG. 6 is an exemplary diagram of a graphical user interface in which information associated with web documents may be presented according to one implementation consistent with the principles of the invention.

FIG. 6 is an exemplary diagram of a graphical user interface in which related information may be presented according to one implementation consistent with the principles of the invention. In this exemplary implementation, assume that the user desired additional information relating to a review of the document by selecting a corresponding link associated with related information 540. In this case, a search may be performed to identify web documents with reviews of the document. For example, search terms, such as a word or words associated with the document's title (e.g., "9/11 Report") or the author's name and a word like "review" or "reviews" (or other search terms that are likely to identify web documents with reviews of the document), may be used to identify relevant web documents.

A set of search results, two examples of which are illustrated in FIG. 6, may be presented to the user. In FIG. 6, the exemplary search results correspond to reviews of a book—the 9/11 Report. Search result 600, for example, may include a web document identifier 610, an excerpt 620 from the web document, and other information 630 associated with the web document. Identifier 610 may identify the web document. Selection of identifier 610 may cause the web document to be presented. Excerpt 620 may include a portion of the web document that may include a search term of the search query. Occurrences of the search term may be visually distinguished (e.g., highlighted) in excerpt 620. Other information 630 may include an address of the web document, a size of the web document, a date associated with the web document, or other information associated with the web document.

Figure 3C:
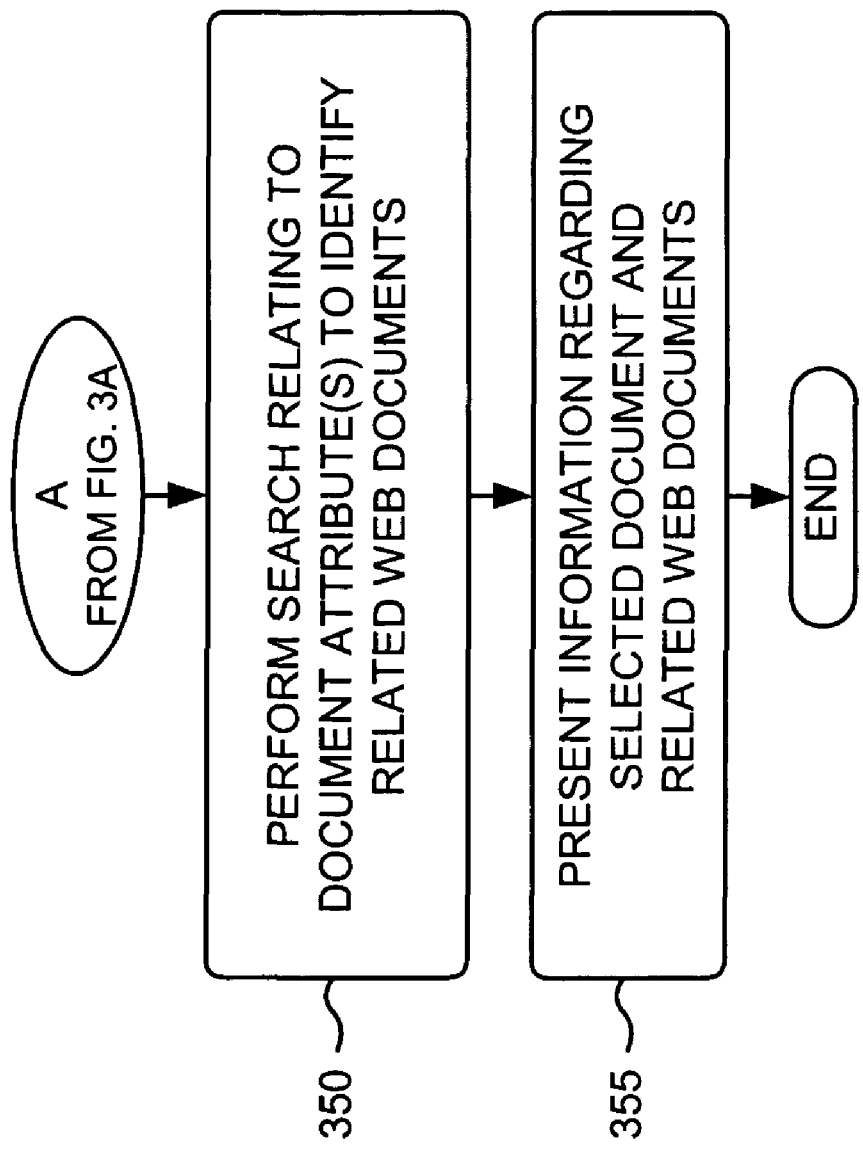

In another implementation consistent with the principles of the invention, a search may be performed in response to the user selecting a document in the search results (act 325) (FIG. 3A). In this implementation, a search may be performed relating to one or more of the document attributes to identify related web documents (act 350) (FIG. 3C). For example, search queries may be formed for different document attributes and searches may be performed to identify relevant web documents. Techniques similar to ones described above may be used to identify and possibly score web documents relevant to a search query.

Detailed information regarding the document, including information regarding the relevant web documents, may be presented to the user, possibly in the form of a reference page (act 355). In one implementation, the reference page may resemble reference page 500 described above with regard to FIG. 5. In this implementation, however, the links associated with related information 540 may be replaced or supplemented with information associated with the relevant web documents.

FIG. 7 is an exemplary diagram of a portion of a reference page 700 according to another implementation consistent with the principles of the invention. In this implementation, a set of search results may be presented to the user relating to one or more document attributes. As shown in FIG. 7, two exemplary search results are presented corresponding to a review of the document 542. As also shown in FIG. 7, a link may be provided for additional search results.

Search result 710, for example, may include a web document source 712, an excerpt 714 from the web document, and other information 716 associated with the web document. Source 712 may include the source of the web document. Selection of source 712 may cause the corresponding web document to be presented. Excerpt 714 may include a portion of the web document that may include a search term of the search query. Occurrences of the search term may be visually distinguished (e.g., highlighted) in excerpt 714. Other information 716 may include an address of the web document, a size of the web document, a date associated with the web document, or other information associated with the web document.

In yet another implementation consistent with the principles of the invention, a search may be performed in response to the user selecting a document in the search results (act 325) (FIG. 3A). In this implementation, a search may be performed relating to one or more document attributes to identify related web documents (act 360) (FIG. 3D). For example, search queries may be formed for different document attributes and searches may be performed to identify relevant web documents. Techniques similar to ones described above may be used to identify and possibly score web documents relevant to a search query.

Information may be extracted from the relevant web documents (act 365). A page, possibly in the form of a reference page, may be created based on the extracted information and the page may be presented to the user (acts 370 and 375). In one implementation, the reference page may resemble reference page 500 described above with regard to FIG. 5. In this implementation, however, the links associated with related information 540 may be replaced or supplemented with the information extracted from the relevant web documents.

FIG. 8 is an exemplary diagram of a portion of a reference page 800 according to a further implementation consistent with the principles of the invention. In this implementation, information may be extracted from web document(s) corresponding to a set of search results and this information may be presented to the user for each type of related information 540. The particular types of information extracted from the search results may include any information that a user might find useful.

As shown in FIG. 8, information extracted from two exemplary search results are presented relating to a review of the document. Information 810, for example, may include information source 812, an optional customer rating 814, a review 816, and other information 818. Source 812 may include the source of the information (e.g., Amazon.com™). Selection of source 812 may cause a web document from the source to be presented. Customer rating 814 may include a rating of the document by customers of source 812 (e.g., Amazon.com™). Review 816 may include a review of the document (or a portion of the review) as provided by source 812 (e.g., Amazon.com™). Other information 818 may include an address of the web document, a size of the web document, a date associated with the web document, or other information associated with the web document.

Alternate Graphical User Interfaces

Figure 9:
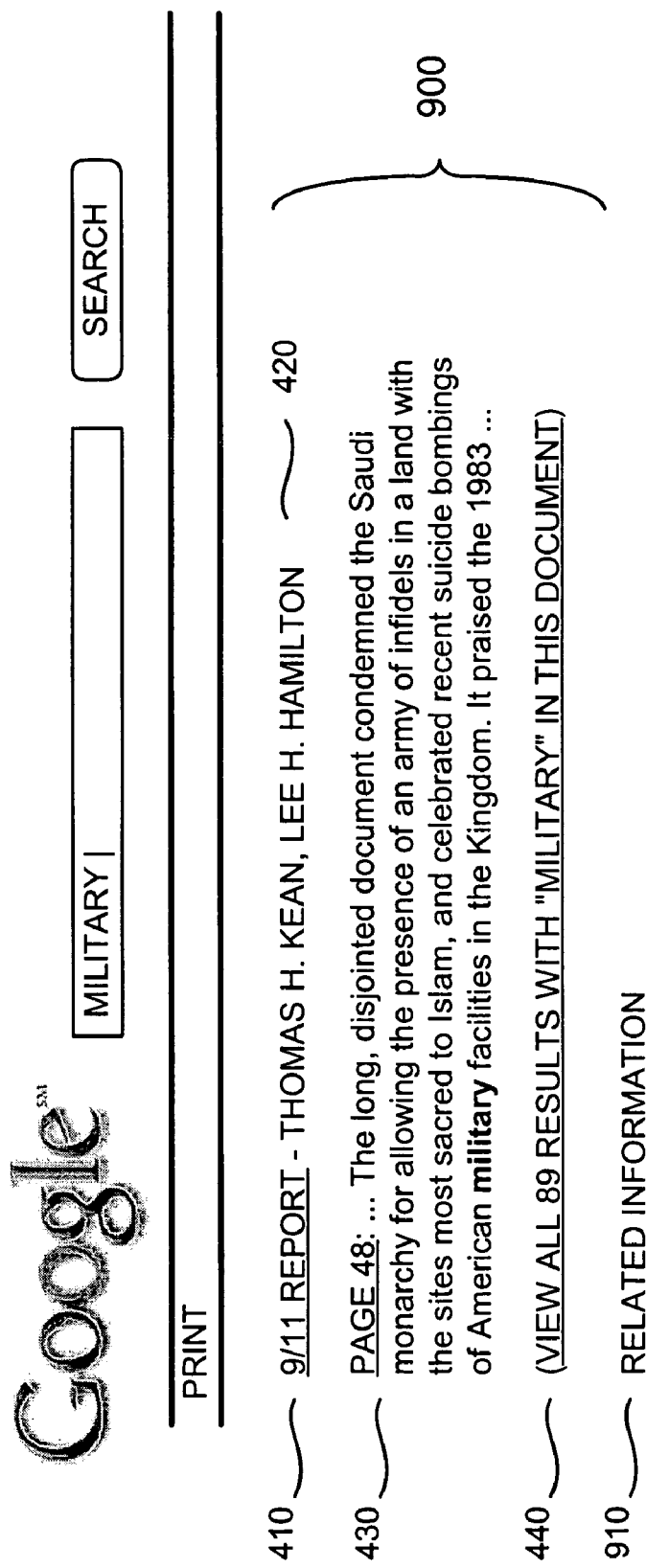
FIG. 9 is an exemplary diagram of a graphical user interface in which information associated with a document may be presented in the form of a search result according to an alternate implementation consistent with the principles of the invention.

In an alternate implementation consistent with the principles of the invention, information may be presented regarding a document similar to that described above with regard to FIG. 4. In this case, however, an additional link may be provided to related information similar to related information 540 (FIG. 5). FIG. 9 is an exemplary diagram of a graphical user interface in which information associated with a document may be presented in the form of a search result 900 according to this alternate implementation consistent with the principles of the invention. As shown in FIG. 9, search result 900 may include a document title 410, author information 420, an excerpt 430 from the document, an optional link 440 to other relevant excerpts in the document, and a link 910 to related information. Document title 410, author information 420, excerpt 430, and optional link 440 may be similar to those described above with regard to FIG. 4.

Link 910 may cause related information to be presented. FIGS. 10A and 10B are exemplary diagrams of graphical user interfaces in which related information may be presented according to two different implementations consistent with the principles of the invention. As shown in FIG. 10A, selection of link 910 may cause a set of links to be provided, which may optionally be separated based on the different types of document attributes with which they are associated. Selection of a link in the set of links may cause a search to be performed and results presented as described above.

As shown in FIG. 10B, selection of link 910 may cause a search to be performed and results to be presented with regard to the different types of document attributes with which they are associated. In one implementation, a set of search results may be provided (similar to FIG. 7). Selection of one of the search results may cause the corresponding web document to be presented as described above. In another implementation, information extracted from the web document(s) corresponding to a set of search results may be provided (similar to FIG. 8).

Conclusion

Systems and methods consistent with the principles of the invention may search for additional information relating to one or more document attributes and provide this additional information in association with the document.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A-3D, the order of the acts may be modified in other implementations consistent with the principles of the invention. Further, non-dependent acts may be performed in parallel.

It has been described that a document is identified as a result of a search and web documents related to the document or an author of the document may be presented. In other implementations, however, the document may be identified in other ways, such as from a directory, category, or other listing of documents.

Also, exemplary graphical user interfaces have been described with respect to FIGS. 4-10B. In other implementations consistent with the principles of the invention, the graphical user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "lone" or similar language is used. Further, the phrase "based on" is intended to mean "based, at least in part, on" unless explicitly stated otherwise.

What is claimed is:

1. A method performed using a computer system, the method comprising:
receiving, from a client device over a network, a search query;
performing a first search to identify a set of search results based on the received search query;
presenting the identified set of search results for display on the client device;

receiving, from the client device, selection of one search result of the identified set of search results;

presenting, for display on the client device, a reference page associated with a scanned document associated with the selected one search result of the identified set of search results, the reference page comprising information regarding the scanned document and a plurality of links, each link of the plurality of links being associated with a second search associated with an attribute associated with the scanned document;

receiving, from the client device, selection of a link from the plurality of links;

performing the second search, based on the received selection of the link, to identify web documents based on the attribute associated with the scanned document; and presenting, based on the performed second search, a result of the second search for display on the client device as a second reference page associated with the scanned document, the second reference page including information regarding the identified web documents and a link associated with an additional search associated with the attribute.

2. The method of claim 1, where the presenting the result of the second search for display as the second reference page comprises:
identifying a web document relating to the attribute;
extracting information from the identified web document; and
presenting the extracted information on the second reference page for display on the client device.

3. The method of claim 1, where the presenting the result of the second search for display as the second reference page comprises:
generating scores for the identified web documents;
sorting the identified web documents based on the generated scores; and
presenting the sorted identified web documents on the second reference page for display on the client device.

4. The method of claim 3, wherein the generating the scores for the identified web documents comprises:
generating information retrieval scores for the identified web documents;
generating link-based scores for the identified web documents; and
generating overall scores for the identified web documents based on the generated information retrieval scores and the generated link-based scores.

5. The method of claim 1, where the reference page comprises at least one of:
a description of the contents of the scanned document;
text associated with one of a jacket, a cover, or a flap associated with the scanned document;
bibliographic information associated with the scanned document; or
an advertisement.

6. The method of claim 1, where the reference page comprises:
an excerpt from the scanned document; and
a set of links to portions of the scanned document.

7. The method of claim 6, where the excerpt comprises an image of a portion of text from the scanned document.

8. The method of claim 6, where the set of links references at least one of:
a front cover associated with the scanned document;
a table of contents associated with the scanned document;
an index associated with the scanned document; or
a back cover associated with the scanned document.

9. The method of claim 1, where the link associated with the additional search was generated by performing the second search.

10. The method of claim 1, where the second reference page further comprises at least one of:
a description of the contents of the scanned document;
text associated with one of a jacket, a cover, or a flap associated with the scanned document;
bibliographic information associated with the scanned document; or
an advertisement.

11. The method of claim 10, where the advertisement is associated with or derived from at least one of the received search query, the scanned document, or user behavior.

12. The method of claim 1, where the second reference page further comprises:
an excerpt from the scanned document; and
a set of links to portions of the scanned document.

13. The method of claim 1, where the attribute corresponds to at least one of a title, an author, a category, a publisher, or a publication date associated with the scanned document.

14. A system, comprising:
a memory to store instructions; and
a processor to execute the stored instructions to:
identify a set of search results;
receive selection of one search result of the identified set of search results;
present, based on the received selection of the one search result of the identified set of search results, a reference page associated with a scanned document associated with the selected one search result of the identified set of search results, the reference page including a link to perform a search based on an attribute associated with the scanned document;
receive selection of the link;
perform the search, based on the received selection of the link, to identify a web document with information relating to the attribute associated with the scanned document; and
present, based on the performed search, information associated with the identified web document as a second reference page, the second reference page including information regarding the identified web document and a link to perform a second search associated with the attribute.

15. The system of claim 14, where the processor further executes the stored instructions to:
generate a score for the identified web document;
sort the identified web document in a group of web documents based on the generated score; and
present the sorted identified web document in the group of web documents.

16. The system of claim 14, where the processor further executes the stored instructions to:
extract information from the identified web document; and
present the extracted information.

17. A method comprising:
receiving identification of a document from a user device;
presenting, to the user device, a reference page associated with the identified document, the reference page including a link associated with a plurality of searches for web documents relating to attributes associated with the identified document;
receiving, from the user device, selection of the link;
automatically performing, based on the received selection of the link, a plurality of searches to identify web documents relating to the attributes; and providing, based on the automatically performed plurality of searches, a second reference page, the second reference page including information regarding the identified web documents and a link associated with a second plurality of searches associated with the attributes.

18. The method of claim 17, where the providing the second reference page includes:
extracting information from the identified web documents; and
presenting the extracted information in the second reference page.

19. The method of claim 17, where the providing the second reference page includes:
generating scores for the identified web documents;
sorting the identified web documents based on the generated scores; and
presenting the sorted identified web documents in the second reference page.

20. A non-transitory computer-readable memory device containing instructions executable by one or more processors, the instructions comprising:
one or more instructions that, when executed by the one or more processors, cause the one or more processors to:
identify a scanned document;
present a reference page associated with the identified scanned document, the reference page including a link associated with a search for a web document with information relating to an attribute associated with the identified scanned document;
receive selection of the link;
perform the search, based on the received selection of the link, to identify web documents with information relating to the attribute;
extract information from the identified web documents; and
present a second reference page, the second reference page including the extracted information along with a second link associated with a second search for a web document with information relating to the attribute.

21. The non-transitory computer-readable memory device of claim 20, the instructions further comprising:
one or more instructions that cause the one or more processors to:
generate scores for the identified web documents;
sort the identified web documents based on the generated scores; and
present the sorted identified web documents.

22. The non-transitory computer-readable memory device of claim 21, the instructions further comprising:
one or more instructions that cause the one or more processors to:
generate information retrieval scores for the identified web documents;
generate link-based scores for the identified web documents; and
generate overall scores for the identified web documents based on the generated information retrieval scores and the generated link-based scores.

23. A method performed using a computer system, the method comprising:
receiving, from a client device over a network, a search query;
performing a first search to identify a set of search results based on the received search query;
presenting the identified set of search results for display on the client device;
receiving, from the client device, selection of one search result of the identified set of search results;
presenting, for display on the client device, a reference page associated with a scanned document associated with the selected one search result of the identified set of search results, the reference page comprising information regarding the scanned document and a link associated with a second search;
receiving, from the client device, selection of the link;
performing the second search, in response to the received selection of the link, to identify web documents based on an attribute associated with the scanned document;
generating scores for the identified web documents;
sorting the identified web documents based on the generated scores;
presenting, for display on the client device, the sorted identified web documents;
identifying a web document of the sorted identified web documents, the web document relating to the attribute;
extracting information from the identified web document of the sorted identified web documents; and
presenting, for display on the client device, the extracted information along with a second link associated with a third search for a web document with information relating to the attribute.

24. The method of claim 23, where the presenting the sorted identified web documents comprises:
presenting a second reference page associated with the scanned document, the second reference page including a link to the web document with the information relating to the attribute.

25. The method of claim 24, where the link was generated by performing the second search.

* * * * *